United States Patent [19]

La Rocca

[11] Patent Number: 4,644,127
[45] Date of Patent: Feb. 17, 1987

[54] METHOD OF CARRYING OUT A TREATMENT ON METAL PIECES WITH THE ADDITION OF AN ADDED MATERIAL AND WITH THE USE OF A POWER LASER

[75] Inventor: Aldo V. La Rocca, Moncalieri, Italy

[73] Assignee: Fiat Auto S.p.A., Italy

[21] Appl. No.: 767,540

[22] Filed: Aug. 20, 1985

[30] Foreign Application Priority Data

Aug. 20, 1984 [IT] Italy ................ 67832 A/84

[51] Int. Cl.⁴ .............................. B23K 27/00
[52] U.S. Cl. ................ 219/121 FS; 219/121 LD; 219/121 LM; 427/53.1; 427/12
[58] Field of Search ....... 219/76.16, 121 LF, 121 LE, 219/121 LM, 121 LD, 121 ED, 121 FS; 427/34, 12, 53.1

[56] References Cited

U.S. PATENT DOCUMENTS

| | | |
|---|---|---|
| 3,952,180 | 4/1976 | Gnanamuthu ............ 219/121 LF |
| 4,157,923 | 6/1979 | Yen et al. ................ 219/121 LF |
| 4,212,900 | 7/1980 | Serlin ..................... 219/121 LF |
| 4,281,030 | 7/1981 | Silfvast .................. 219/121 LF |
| 4,299,860 | 10/1981 | Schaefer et al. ........ 219/121 LE |
| 4,300,474 | 11/1981 | Livsey ................... 219/121 LE |
| 4,323,756 | 4/1982 | Brown et al. ........... 219/121 LF |

FOREIGN PATENT DOCUMENTS 0136294 10/1981 Japan ............................ 219/121 LE

*Primary Examiner*—M. H. Paschall
*Attorney, Agent, or Firm*—Sughrue, Mion, Zinn, Macpeak and Seas

[57] ABSTRACT

The method allows a treatment (cutting, welding, alloying or surface hardening, etc.) to be carried out on a metal piece with the addition of an added material and with the use of a power laser. The metal piece is heated locally and the added material is brought into a plastic or liquid state by means of laser radiation so as to fuse it with the piece. The added material used is a powder.

2 Claims, 8 Drawing Figures

METHOD OF CARRYING OUT A TREATMENT ON METAL PIECES WITH THE ADDITION OF AN ADDED MATERIAL AND WITH THE USE OF A POWER LASER

FIELD OF THE INVENTION

The present invention relates to a method of carrying out a treatment on metal pieces with the addition of an added material and with the use of a power laser to heat the metal pieces locally and bring the added material to a plastic or liquid state so as to fuse it with the pieces.

The term "treatment" is intended to mean processes carried out on metal pieces, such as cutting, welding, alloying or surface hardening, with the addition of filling material, etc.

STATE OF THE PRIOR ART

According to the prior art, the added material used, whether in welding or in other processes with the addition of material, is usually in the form of wires or rods. When a power laser beam is used to fuse this added material, the use of wires or rods of added material has certain drawbacks. In the first place, such wires or rods reflect and diffract (scatter) the laser radiation incident thereon, and create a "shadow" on the piece or pieces being treated: in the shadow area the added material may not adhere properly or may be downright "rejected", since the surface does not become hot enough.

The reflection and diffraction of the laser radiation caused by a wire or rod of added material necessitates an increase in the intensity of the laser beam incident thereon, which may cause the forceful ejection of material ("sputtering") and the "splashing" of the rod once the reflective surface layer is penetrated. Similar undesirable effects may also be produced by a laser beam of excessive energy striking the piece being treated.

In order to avoid such drawbacks, some insert the wire in the fused zone, but with this solution one has the disadvantage of cooling the fused zone and there is therefore less possibility of mixing and diffusion of the added material within the material of the workpiece.

A further problem encountered when added material in the form of rods or wires is used arises from the formation of oxides on the surfaces of these wires or rods, which may compromise the quality of the process carried out.

OBJECT OF THE INVENTION

The object of the present invention is to propose a method of carrying out treatments on metal pieces of the aforesaid type, which allows the drawbacks of the prior art to be overcome.

SUMMARY OF THE INVENTION

This object is achieved according to the invention by means of a method of carrying out a treatment on metal pieces with the addition of added material, characterised in that a powdered added material is used.

According to a further aspect of the invention, particularly for adding material to at least a portion of the surface of a piece so as to effect, for example, surface alloying or hardening, the method is characterised in that the powdered material intended to form the addition is poured onto a surface portion of the piece after this portion has been irradiated by the laser beam through the powdered added material for a period of time sufficient to bring this portion of the piece to a predetermined temperature (pre-heating).

Preferably, moreover, the portion of the piece to which the added material has just been added continues to be irradiated by the laser beam for a predetermined period of time (post-heating).

While the surface portion of the piece, onto which the powdered material intended to form the addition is poured, is irradiated by the laser beam through this powder, the latter is brought to a plastic or liquid state before reaching the surface of the piece. In this way, the adhesion is facilitated by interfusion ("cladding") or amalgamation (alloying) with the material of the piece.

At the same time, the reduction of the intensity of the laser beam by absorption by the powder and also by distribution of the beam over a greater area to effect pre-heating and/or post-heating, limits to the fusion zone the "energy impact" which can cause convective movement and wave-formation in the fused material, and possible "splashing" of the material, that is explosive expulsion of the added material, as may occur, for example, in the case of additions carried out with powders applied in the form of a paste with organic binders.

According to a further characteristic of the invention, the powdered added material is dropped onto the piece mixed with an inert gas, preferably of a higher specific gravity than that of air, for example, argon. This effectively prevents the formation of oxides and the related disadvantages.

In addition, the movement of the powder, which would occur chiefly as a fluidised bed, may be controlled and facilitated by means of ultrasonic vibrations applied to the delivery and/or the container for the powder.

The method according to the invention, applied to the welding of pieces using welding material, allows welding to be carried out mechanically and also in an aesthetically improved manner, since the welding powder (like the surfaces which will receive it) is under temperature conditions which allow the welding channels to to be filled more thoroughly in that the powder behaves substantially as a superheated liquid which is filling a cavity with surfaces at the interfusion temperature. Thus, the possibility of cavity or void formation is limited. By means of appropriate post-heating, it is even possible to produce a perfectly smooth seam-weld ("cosmetic welding").

Feasibility tests conducted by the Applicant for treatments using added material have already demonstrated that the method according to the invention drastically reduces irregularities in the final finished surface of the treated piece.

If the powdered added material is poured onto the workpiece or workpieces at a suitable speed and rate, and if the spatial density and/or the speed of the particles in the flow of powder is appropriate, the flow of added material is sufficiently "transparent" to laser radiation for the formation of a shadow on part of the piece being treated to be practically avoided.

Moreover, the section and the intensity of the laser beam, as well as the particle-size and the speed of fall of the powder, should be chosen so as to ensure that the particles have time to heat up, melt and be superheated before striking the piece, the latter being appropriately pre-heated.

BRIEF DESCRIPTION OF THE DRAWINGS

Further characteristics and advantages of the invention will become apparent from the detailed description which follows with reference to the appended drawings, provided purely by way of non-limiting example, in which.

DESCRIPTION OF SEVERAL EMBODIMENTS

Figure 1:
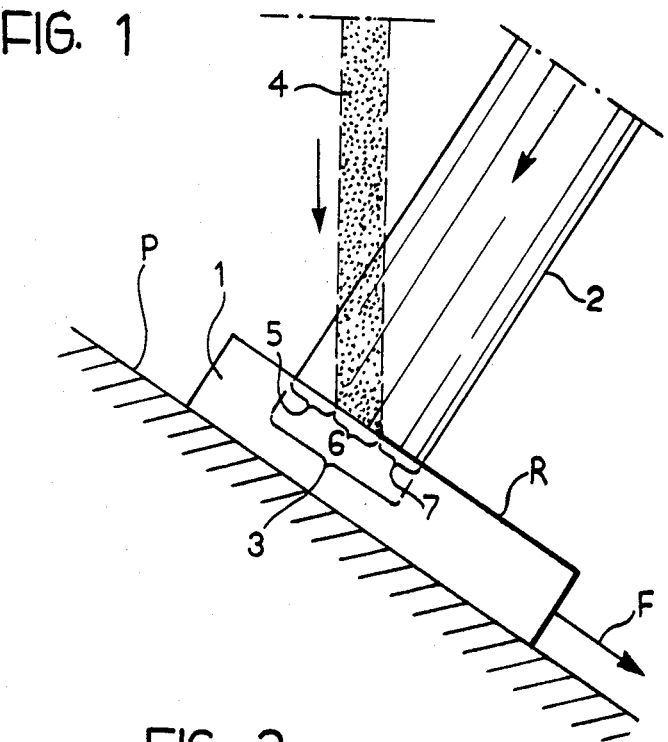
FIG. 1 shows schematically a workpiece to which a powdered added material has been added, with the use of a power laser beam.

In FIG. 1, a metal piece to be treated, indicated 1, is mounted on an inclined plane P for translation in the direction of the arrow F. A power laser beam 2 is directed by a generator (not illustrated) towards a small area 3 of the surface of the piece 1.

The beam 2 could be non-orthogonal to the surface of the piece 1, so as to avoid its reflection towards the generator and to allow the possible redirection of the reflected radiation onto the piece, as proposed, for example, in U.S. Pat. No. 4,288,678 and in an Italian patent application of even date herewith, filed by the same Applicant.

A flow 4 of powdered added material, for example, a metal alloy preferably mixed with an inert gas, such as argon, helium or dry nitrogen, or a reducing gas, so as to prevent surface oxidation of the powder particles, is also directed towards the area 3.

Preferably, the flow of added material 4 has a smaller section than the laser beam 2 and strikes an area 6 of the surface of the piece lying within the area 3 struck by the laser beam.

The flow of powdered added material is therefore struck by the laser beam 2 before reaching the surface of the piece 1. In addition, the size and density of the particles of the flow 4 and their speed of fall are maintained between such limits that the flow 4 is, in practice, sufficiently "transparent" to the laser radiation.

Thus, in the area 3 struck by the laser beam, there can be recognized an area 5 struck by the laser radiation but not yet by the powdered added material, the above-defined area 6 struck by the powdered added material and by the laser radiation, and an already-treated zone 7 struck by the laser radiation.

The zones 5 and 7 are subjected respectively to pre-heating and post-heating. The pre-heating tends to reduce the local temperature gradients in the zone where the material is added, while the post-heating facilitates the spreading of the added material on the surface of the piece, with a consequent improvement of the aesthetic and mechanical characteristics of the addition carried out. In FIG. 1, the layer of added material on the surface of the piece 1 is indicated R.

Conveniently, according to the invention, the flow of powdered added powder 4 is irradiated with the laser beam 2 immediately before this flow reaches the surface of the piece, in such a way that the powdered added material is brought into a plastic, liquid or superheated liquid state. Thus, the added material reaching the surface of the piece forms a "hot blob" and its adhesion or interfusion with the already pre-heated surface of the piece proves to be significantly facilitated. The subsequent stage of actual treatment can therefore be accomplished with a lower power and with consequently lower dynamic effects. This results in better adhesion at the interface and improved uniformity of the material, reduction of the internal stresses of thermal-metallurgical origin, and improved surface conditons. All these properties may be further improved in the following post-heating stage.

Figure 2:
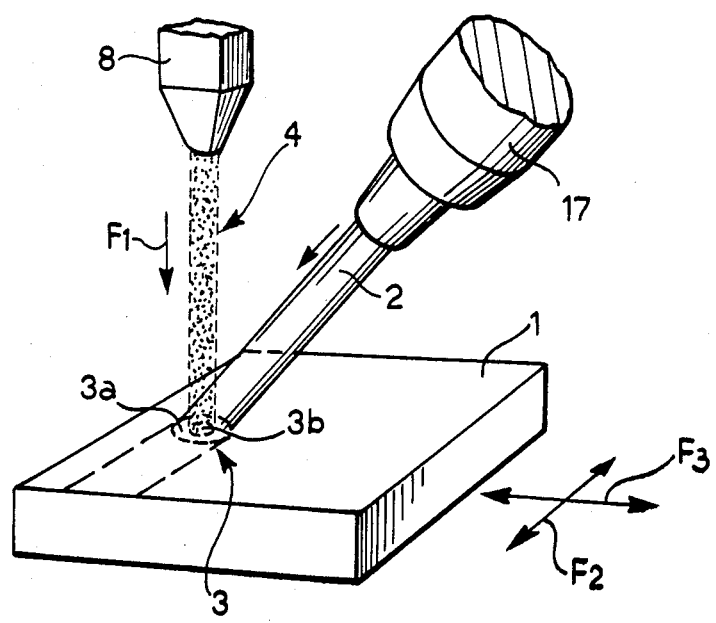
FIG. 2 shows schematically parts of a piece of equipment usable for carrying out the method of the invention, for forming a coating of hard material on a flat metal piece.

FIG. 2 shows a different arrangement of the piece 1 to be treated and of the directions of the laser beam and the flow of powdered added material falling on this piece. In this drawing, the source of laser radiation, which directs a laser beam 2 in a direction that is inclined to the surface of the piece 1, is indicated 17. Above the area 3 of the upper surface of this piece is located a device 8 for supplying the powdered added material mixed with an inert or reducing gas.

The laser radiation source 17 and the supply device 8 may be supported in respective fixed positions, in a manner not illustrated, while the metal piece 1 to be treated is translatable in the directions indicated by the arrows $F_2$ and $F_3$.

The supply device 8 may comprise a hopper provided with a flow interruptor, such as a shutter screen. The operation of the interruptor may be coordinated and synchronised with the operation of the laser generator 17 by means of one or more regulation and control rings.

The supply device may also include a vibrator, for example ultrasonic, to assist the movement and fall of the powder.

Starting from a corner of the piece 1 (the left-hand corner as seen in FIG. 2) it is possible, therefore, to add a layer R of coating material to the entire surface of the metal piece 1 by means of successive "passes".

Figure 3:
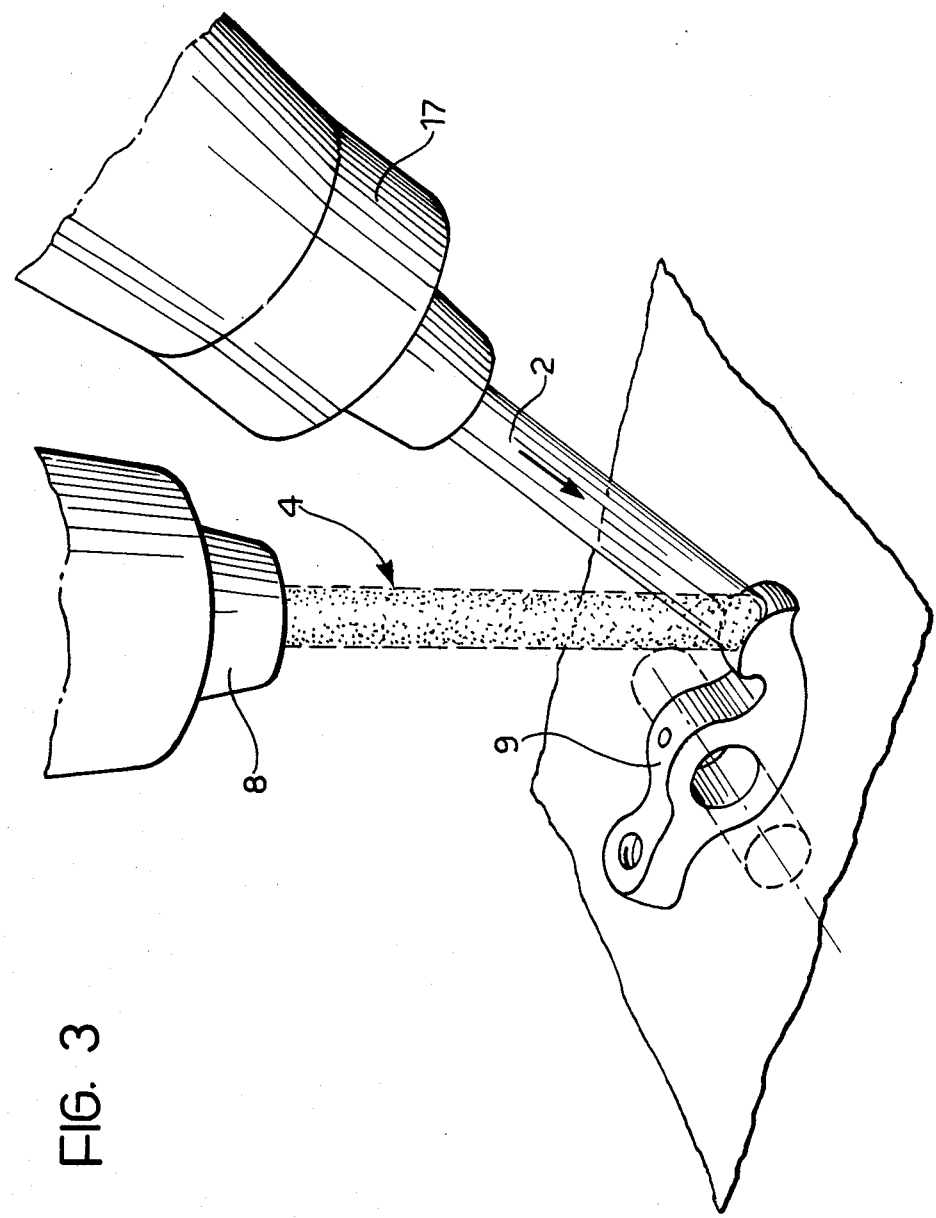
FIG. 3 illustrates equipment similar to that shown in FIG. 1, used for hard-facing one end of a rocker arm for controlling an intake or exhaust valve of an internal combustion engine.

FIG. 3 illustrates equipment similar to that of FIG. 2, used to hard-face a portion of the surface of one end of a rocker arm 9 for an intake or exhaust valve of an internal combustion engine. In this case, the powdered added material 4 consists, for example, of nickel-chrome powder.

In a similar manner, it is possible to coat the exhaust valves of internal combustion engines with stellites.

Figure 4:
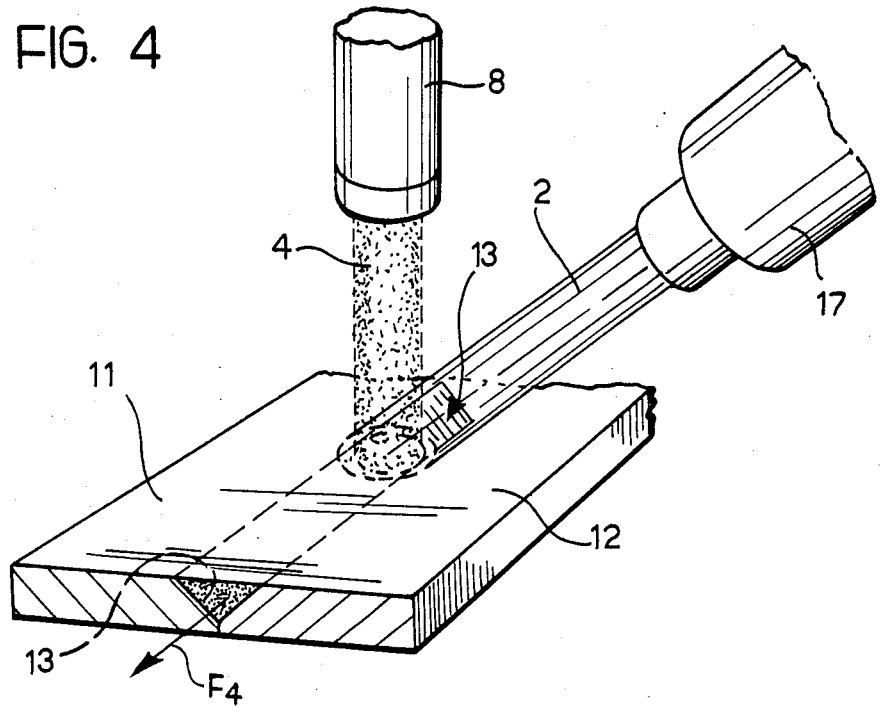
FIGS. 4 to 6 show butt welding with welding material, carried out in accordance with the method of the invention.

The use of powdered added material may also be extended to the case of welding, as illustrated by way of example in FIG. 4. This drawing shows two butt-jointed metal pieces 11, 12 with their facing edges bevelled in such a way as to form together a channel 13 intended to be filled with a seam weld formed from a powdered welding material poured and melted in this channel in one or more successive passes. In this case also, the laser generator 7 and the supply tube 87 may be kept in fixed positions and the pieces may be moved relative to them in the direction of the arrow $F_4$, or instead the pieces may be held in a fixed position and the laser source 7 and the tube 8 for supplying the welding material may be moved together in the opposite direction to the arrow.

Caulking in the case of laser welding may also prove unnecessary, as the welding material is added in a "keyhole" zone the formation of which is facilitated by the presence of a gap between the pieces, this gap acting as a light guide.

Figure 5:
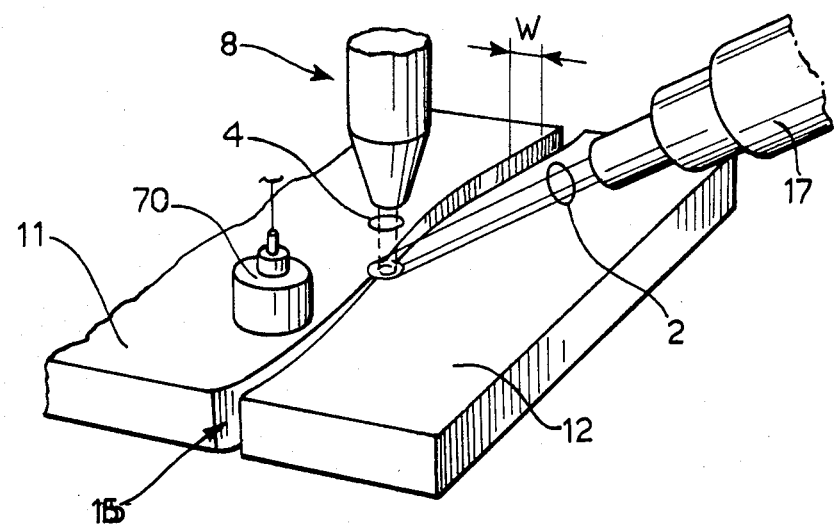

FIG. 5 illustrates the butt welding of two pieces or sheets 11, 12 defining between them a gap 15 of variable width w. A gap-width detector 70 (of a type known in itself, for example comprising proximity sensors) may be used whereby the operation of the laser generator 17 and the powder supply device 8 is governed by variations in the width of the gap.

Figure 6:
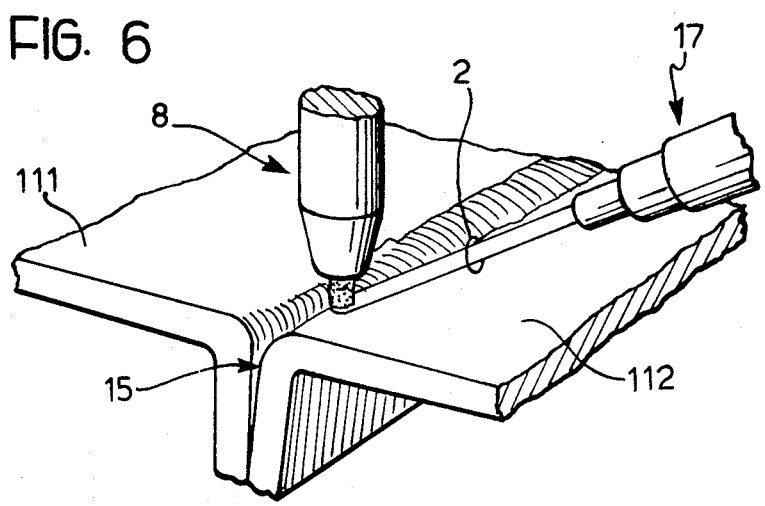
Figure 7:
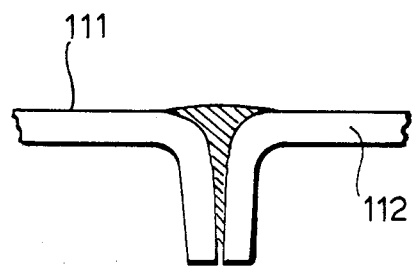
FIG. 7 shows a weld carried out in the manner illustrated in FIG. 6.

FIG. 6 shows the butt welding of two sheets 111 and 112 forming respective tabs in the welding zone. In this case also, if the width of the gap is variable, it is possible to use an appropriate detector to control the operation of the laser generator and the powder supply tube. After welding, the joint appears as illustrated in FIG. 7. The seam weld is smooth and bright (cosmetic welding).

Figure 8:
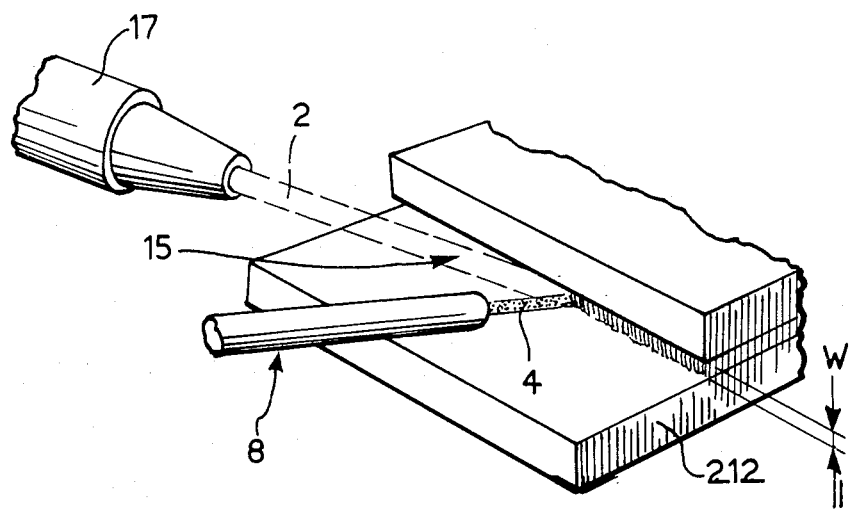
FIG. 8 shows the welding of two "skid" plates.

FIG. 8 shows the welding of two "skid" plates 211, 212 with a gap 16 extending vertically: the inert gas which is mixed with the powdered welding material is pressurised slightly so that the powder can be directed accurately towards the gap. The trick of exerting a slight overpressure on the enveloping gas enables a flow of powdered welding material to be directed towards gaps or welding zones whatever their orientation.

In all cases, and in all applications, the zone struck by the laser may be "covered" by defocusing and/or oscillating the beam in a manner know in the art.

The beam may oscillate in the direction of advance of the welding or orthogonal thereto, or else in a direction combining the two.

I claim:

1. A method for applying a powdered material to a metal piece by means of a power laser and gas stream assembly comprising:
   irradiating a first area on a surface of a metal piece with a laser beam from said power laser;
   conveying said powdered material through a portion of said laser beam by means of said gas stream to a second area on said surface smaller than and completely within said first area to bring said powdered material to a plastic or liquid state prior to contacting said surface; and
   moving said power laser and gas stream assembly and said metal piece relative to each other whereby the surface of the metal piece is preheated by said laser beam prior to the application of the powdered material in the plastic or liquid state to the surface and is postheated by said laser means after the application of the powdered material in the plastic or liquid state to the surface of said metal piece.

2. A method as set forth in claim 1 further comprising placing an additional metal piece adjacent said first mentioned metal piece with a gap therebetween and directing said laser beam and said gas stream containing powdered material onto the surfaces of said pieces adjacent said gap to weld said pieces together.

* * * * *